R. D. KOHNE.
TRACTOR PROPULSION MECHANISM.
APPLICATION FILED MAY 22, 1918.
1,362,802.  Patented Dec. 21, 1920.
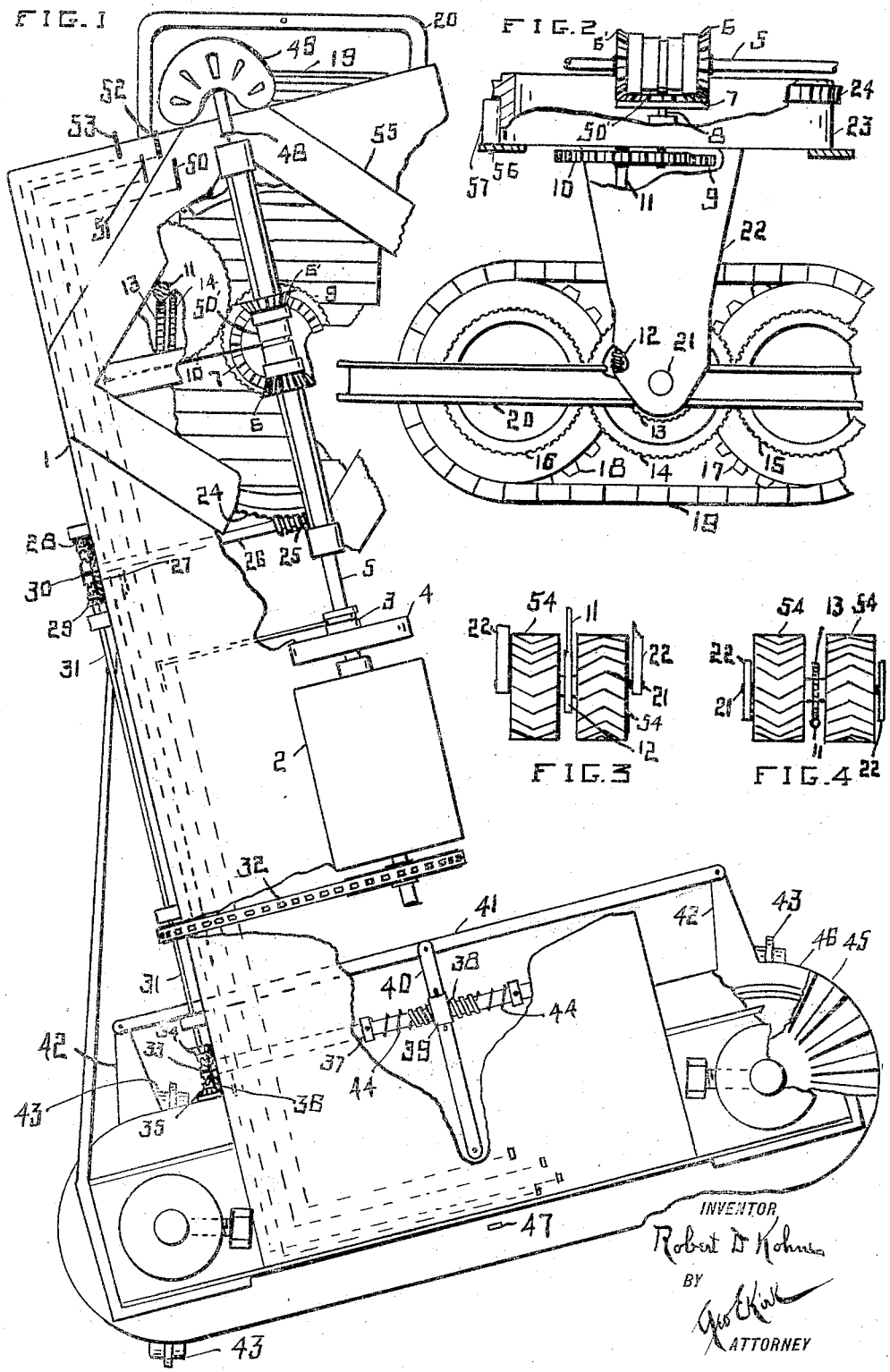

UNITED STATES PATENT OFFICE.

ROBERT D. KOHNE, OF TOLEDO, OHIO.

TRACTOR PROPULSION MECHANISM.

1,362,802.  Specification of Letters Patent.  Patented Dec. 21, 1920.

Application filed May 22, 1918. Serial No. 235,919.

*To all whom it may concern:*

Be it known that I, ROBERT D. KOHNE, a citizen of the United States of America, residing at Toledo, Lucas county, Ohio, have invented new and useful Tractor Propulsion Mechanisms, of which the following is a specification.

This invention relates to features of frame support and propulsion of vehicles.

This invention has utility when incorporated in tractors, especially of the three-point support type.

Referring to the drawings:

Figure 1 is a fragmentary plan view of an embodiment of the invention in a three-point support tractor designed especially for agricultural or farm work;

Fig. 2 is a view in side elevation of the propulsion support for the tractor of Fig. 1, parts being broken away;

Fig. 3 is a fragmentary detail in elevation of a double traction wheel drive; and Fig. 4 is a plan view of the wheels of Fig. 3.

The frame 1 has disposed thereon the internal combustion multiple cylinder motor 2 which, through clutch 3 and fly wheel 4 may drive shaft 5 having pinions 6 and 6' loose thereon in mesh with bevel gear 7 mounted on shaft 8 to carry a gear 9. Shifting of clutch 50' effects driving in the desired direction. The gear 9 is in mesh with a gear 10 on a vertical shaft 11 having on its lower portion a worm 12 in mesh with worm wheel 13 driving an adjacent gear 14 in mesh with gears 15, 16, actuating apron wheels 17, 18, carrying an endless load-carrying propulsion apron 19.

The wheels 17, 18, are mounted in a yoke frame 20 rockably connected by shaft 21 in brackets 22 downwardly extending from the drum or support 23, held in the frame 1 by plates 55, 56. The worm 12 will permit rocking of the yoke frame 20 and still keep in proper mesh with the worm wheel 13. As apron wheels 17, 18, are driving wheels, the only tendency of the apron 19 in propelling is to adapt itself to the grade for effective driving.

The shaft 11, parallel to the shaft 8, is eccentric of the drum 23 and its axis shaft 8. The concentric drive by gearing 6, 7, permits constant driving connection for propelling the vehicle from the driving means 2 on the frame 1, regardless of steering or shifted position of the drum 23.

Shifting or steering of the drum 23 is effected by the worm wheel 24 actuated by worm 25 on shaft 26 having thereon bevel gear 27 in mesh with loose bevel pinions 28, 29, which may be connected by clutch 30 for actuating either one from shaft 31, thereby constituting a reversible drive for shifting the drum 23 in either direction. Shaft 31 is driven by gearing 32 from the motor 2.

The shaft 31 extends to carry a second splined clutch sleeve 33 shiftable to connect either bevel pinion 34 or 35 for driving bevel gear 36 on shaft 37 having thread 38 extending through nut 39 mounted to transmit its travel along axially fixed shaft 37 to rock the lever 40, and through the link 41 and arms 42 shift the caster wheels 43 and hold them adjusted due to the angle of friction of the thread 38. In the event the drive is continued, the steering or shifting is automatically limited by the short extent of the thread 38, the nut 39 running free thereof, but being held firmly thereagainst by helical springs 44, so that immediately upon reversal of the direction of rotation of shaft 37 the nut 39 will at once work back on the thread 38. By supplementary corrugated plate 45 having its radial ribs interfit with the bottom ribs on arm carrying plate 46, there may be angular adjustment of the wheels 43 as to arms 42 permitting any desired veer of frame 1 as a travel direction for the tractor, as in cultivating corn rows, etc., or tracking one support in a furrow and the others out.

The vehicle is susceptible of travel in either direction, having socket 47 at the caster end of frame 1 and socket 48 at the drum end of frame 1, in either of which sockets seat 49 is removably mountable. Removable direction control handle 50 may be associated adjacent either position of seat 49, together with removable handle 51 for clutch 3, removable drum shifting handle 52 for clutch 30, and removable caster shifting handle 53 for clutch 33.

Instead of using an apron at the support 23, to coöperate with the supports of caster wheels 43, there may be a pair of traction or propulsion wheels 54 mounted on shaft 21 with the worm wheel 13 disposed therebetween, as shown in Figs. 3, 4.

What is claimed and it is desired to secure by Letters Patent is:

1. A tractor including a frame, driving means for the tractor mounted upon the frame, a propulsion support for the frame pivotally mounted on the frame, carrying wheels for the support, toothed wheels fixed with the carrying wheels, a shaft parallel to the axis of the support and eccentric thereto, and gearing between the driving means and shaft and from the shaft to the toothed wheels for driving the carrying wheels.

2. A tractor including a frame, a propulsion support pivotally mounted in the frame, an eccentric downwardly extending shaft in said support, driving means mounted on the frame, driving gearing from the means and disposed for coacting concentrically of the support for rotating said shaft, support carrying apron wheels, and toothed gearing from the shaft to said apron wheels.

3. A tractor including a frame, a support pivotally mounted in the frame, a carrying apron rockably mounted on the support, regardless of the support position as to the frame for automatic rocking in taking care of surface irregularities during travel, a steering mechanism, and driving means mounted on the frame and provided with actuating connections through the support for operating the apron and the steering mechanism.

4. A tractor including a frame, a support pivotally mounted in the frame, a carrying apron rockably mounted on the support, and driving means for the apron including a shaft parallel with the support pivotal mounting axis.

5. A tractor including a frame, a carrying apron connected thereto, a horizontal rocking axis for the apron, driving means mounted on the frame, and gearing from the means to the apron including a vertical worm shaft and a worm wheel on the rocking axis.

6. A tractor including a frame, a carrying apron, a support for the apron pivotally connected to the frame, steering mechanism, and driving means for the steering mechanism and having apron actuating connections extending from the frame permitting horizontal pivot axis rocking of the apron as to the frame in different angular positions of the support as to the frame.

7. A tractor including a frame, a support pivotally mounted in the frame, a carrying apron rockably mounted in the support in different angular positions of the support as to the frame, steering mechanism, and driving means mounted on the frame having actuating connections for the steering mechanism and for the apron extending over and down through the support.

8. A three point support tractor embodying a frame, independently controllable means for determining the veer of the frame and steering the tractor, one of said means including a carrying apron rockable as to the frame in its different directing positions, and driving means on the frame for the apron, and the steering means.

In witness whereof I affix my signature.

ROBERT D. KOHNE.